Feb. 14, 1950 — H. E. SCHINDLER — 2,497,188
FISHHOOK HOLDER
Filed Nov. 26, 1948
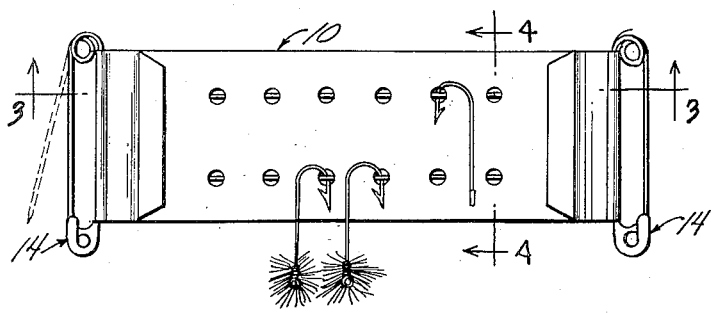
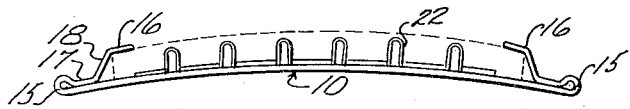
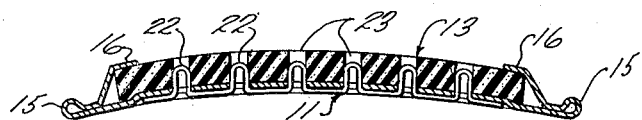
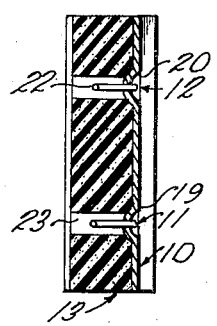
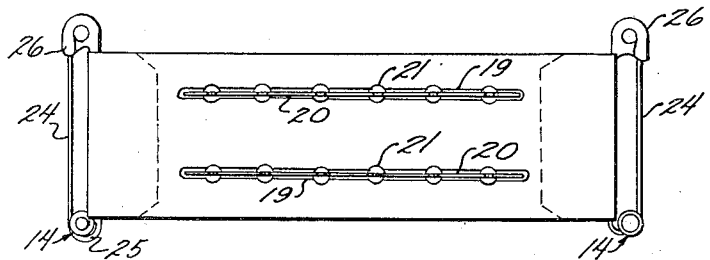
INVENTOR.
HENRY E. SCHINDLER
BY
McMorrow, Berman & Davidson
ATTORNEYS Patented Feb. 14, 1950

2,497,188

UNITED STATES PATENT OFFICE 2,497,188

FISHHOOK HOLDER

Henry E. Schindler, Seattle, Wash.

Application November 26, 1948, Serial No. 61,963

2 Claims. (Cl. 43—57.5)

This invention relates to fish hook holders, and more particularly to a holder adapted to be attached to the clothing of a fisherman to releasably carry spare hooks for convenient removal from the holder and attachment to a fishing line to replace lost hooks, when necessary.

It is among the objects of the invention to provide a fish hook holder of small size and light weight which can be attached to clothing without damaging the clothing or interfering, in any way, with the activities of the wearer of the clothing, and will hold a supply of spare fish hooks in a manner such that, while the points of the hooks cannot become exposed, the hooks can be quickly and easily detached, which will support the hooks on the user's person in a convenient position for easy removal of the hooks by one hand of the user, and which is simple and durable in construction, economical to manufacture, and neat and attractive in appearance.

Other objects and advantages will become apparent from a consideration of the following description and the appended claims in conjunction with the accompanying drawing, wherein:

Figure 1 is a front elevation of a fish hook holder illustrative of the invention;

Figure 2 is a top plan view of the holder illustrated in Figure 1 with the holder-attaching pins omitted;

Figure 3 is a longitudinal cross-section taken substantially on the line 3—3 of Figure 1;

Figure 4 is a transverse cross-section on an enlarged scale taken substantially on the line 4—4 of Figure 1; and Figure 5 is a rear elevation of the holder illustrated in Figure 1.

With continued reference to the drawing, the fish hook holder comprises, in general, a back 10, two wires 11 and 12 having series of fish hook retaining eyes therein, a pad 13 of resilient material, such as sponge rubber, and a pair of pin fasteners 14.

The back 10 is an elongated, rectangular piece of thin sheet metal having a width somewhat greater than the length of a fish hook normally used in fly fishing, and having a length sufficient to support a supply of ten or twelve spare fish hooks thereon. The end portions of the back are folded over to provide at each end of the back a loop 15 and an offset flange 16 disposed inwardly of the adjacent loop. Each flange is attached to its corresponding loop by integral portions 17 and 18 of the folded-over end part of the back, the portion 17 lying along the front surface of the back in contact therewith, and the portion 18 being inclined outwardly from the back and away from the adjacent loop 15 from the portion 17 to the adjacent edge of the flanged portion 16.

Between the folded-over end portions, the back is provided with a pair of elongated, substantially parallel grooves 19 and 20, and with a respective series of longitudinally, spaced-apart apertures 21 in each of these grooves.

Each wire member 11 and 12 has formed therein a series of spaced-apart, U-shaped eyes 22, each having an outside width substantially equal to the diameter of an aperture 21, and having a length somewhat less than the distance between the back and the offset flanges 16. The wire 11 is disposed in the groove 19 with its eyes 22 projecting through the corresponding apertures 21 and disposed substantially perpendicular to the back 10, and the wire 12 is disposed in the groove 20 with its eyes 22 extending through respective apertures 21 in this groove, and also disposed substantially perpendicular to the front face of the back.

The pad 13 is an elongated, rectangular piece of soft, resilient material, such as sponge or foam rubber, having a width substantially equal to the width of the back 10, a length equal to the distance between the outer edges of the flanges 16, and a thickness somewhat greater than the length of the eyes 22 of the wires.

The pad 13 has its ends secured between the back and the flanges 16 and is provided with two series of spaced-apart apertures 23 which respectively receive the eyes 22 of the two wires 11 and 12.

The fasteners 14 are conveniently provided as conventional safety pins having their backs secured in the loops 15 with their shanks 24 spaced outwardly from the respective loops, the shanks being connected at one end to the backs by the usual resilient, looped portion 25, and releasably secured at their free ends in respective heads 26.

With the above-described arrangement, the pointed ends of the hooks are inserted through eyes 22 by first depressing or compressing the portions of the resilient pad around the respective eyes, so that the hooks are held in the manner illustrated in Figure 1. Upon release and reexpansion of the resilient material of the pad, each hook will be firmly held in the outer end of the eye in which it is engaged, and its point will be embedded in the resilient material of the pad, so that the point cannot become accidentally exposed while the hook is carried on the holder. A hook is removed by compressing the portion of the pad around the corresponding eye to free the hook in the eye, and then pushing the pointed end of the hook out of the eye, applying pressure to the hook in a direction to maintain the barb clear of the eye while the pointed end of the hook is being removed.

The holder is of extremely light weight, so that its presence on the clothing of a fisherman is hardly noticeable, is of such small size that it does not interfere in any way with the activities of the fisherman, may be attached to the fisherman's clothing in a position for convenient removal of the hooks, such as high upon the chest at one side or the other, and is so simple and economical in manufacture that it may be sold in large volume at a substantially nominal cost.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish hook holder comprising a thin-walled rectangular back having at each end a folded-over portion providing an offset flange at each end of said back, said back having spaced-apart apertures therein between said flanges, a wire having U-shaped eyes therein secured to said back with said eyes extending through respective apertures in said back, and a pad of resilient material disposed on said back with its ends secured between said back and said offset flanges, said pad having apertures therein receiving respective eyes of said wire and having a thickness greater than the distance said eyes extend from said back, whereby fish hooks may be inserted through said eyes upon compression of the portions of the resilient pads surrounding said eyes and will be firmly held in said eyes with their points embedded in said pad upon re-expansion of the resilient pad material.

2. A fish hook holder comprising a thin, rectangular back having at each end a folded-over portion providing an offset flange at each end of said back, said back having a pair of spaced-apart, substantially parallel grooves extending longitudinally thereof between said offset flanges, and a series of spaced-apart apertures in each groove, a wire secured in each groove, each wire including a series of U-shaped eyes extending respectively through the corresponding series of apertures, and a pad of resilient material disposed on the side of said back opposite said grooves, said pad having apertures therein receiving respective eyes of said wire and having a thickness greater than the distance said eyes extend from said back.

HENRY E. SCHINDLER.

REFERENCES CITED

The following references are of record in the file of this patent:

UNITED STATES PATENTS

| Number | Name | Date |
| --- | --- | --- |
| 491,136 | Rosenblatt et al. | Feb. 7, 1893 |
| 2,173,363 | Hillmer | Sept. 19, 1939 |
| 2,387,639 | Bouchelle | Oct. 23, 1945 |